(12) United States Patent
Eri et al.

(10) Patent No.: US 9,249,359 B2
(45) Date of Patent: Feb. 2, 2016

(54) CATALYST TREATMENT

(75) Inventors: Sigrid Eri, Ranheim (NO); Erling Rytter, Trondheim (NO); Rune Myrstan, Jakobsli (NO)

(73) Assignee: GTL.F1 AG, Zurich (CH)

( * ) Notice: Subject to any disclaimer, the term of this patent is extended or adjusted under 35 U.S.C. 154(b) by 234 days.

(21) Appl. No.: 13/811,588

(22) PCT Filed: Jul. 15, 2011

(86) PCT No.: PCT/GB2011/001067
§ 371 (c)(1),
(2), (4) Date: Apr. 2, 2013

(87) PCT Pub. No.: WO2012/010820
PCT Pub. Date: Jan. 26, 2012

(65) Prior Publication Data
US 2013/0184360 A1 Jul. 18, 2013

(30) Foreign Application Priority Data

Jul. 22, 2010 (GB) .................. 1012326.3

(51) Int. Cl.
| | |
|---|---|
| *B01J 21/04* | (2006.01) |
| *B01J 33/00* | (2006.01) |
| *B01J 37/14* | (2006.01) |
| *B01J 37/18* | (2006.01) |
| *B01J 23/75* | (2006.01) |
| *C10G 2/00* | (2006.01) |
| *B01J 23/755* | (2006.01) |
| *B01J 23/78* | (2006.01) |

(Continued)

(52) U.S. Cl.
CPC ................ *C10G 2/332* (2013.01); *B01J 23/75* (2013.01); *B01J 23/755* (2013.01); *B01J 23/78* (2013.01); *B01J 23/8896* (2013.01); *B01J 23/8913* (2013.01); *B01J 33/00* (2013.01); *B01J 35/1019* (2013.01); *B01J 35/1033* (2013.01); *B01J 37/0207* (2013.01); *B01J 37/14* (2013.01); *B01J 37/18* (2013.01); *C10G 2/342* (2013.01); *B01J 21/04* (2013.01); *B01J 23/005* (2013.01); *B01J 37/0201* (2013.01); *C10G 2300/703* (2013.01); *C10G 2300/705* (2013.01)

(58) Field of Classification Search
CPC ........ B01J 21/04; B01J 33/00; B01J 35/1019; B01J 35/1033; B01J 37/0201; B01J 37/14; B01J 37/18; B01J 23/8913; B01J 23/75; B01J 23/005; C10G 2/332; C10G 2300/703; C10G 2300/705
USPC .................................. 502/325; 518/715, 728
See application file for complete search history.

(56) References Cited

U.S. PATENT DOCUMENTS

| | | | | | |
|---|---|---|---|---|---|
| 4,585,798 | A | * | 4/1986 | Beuther et al. | 518/715 |
| 4,605,676 | A | * | 8/1986 | Kobylinski et al. | 518/700 |

(Continued)

FOREIGN PATENT DOCUMENTS

| | | | | |
|---|---|---|---|---|
| WO | WO 99/42214 | | 8/1999 | |
| WO | 2004/043596 | * | 5/2004 | B01J 35/10 |

(Continued)

*Primary Examiner* — Patricia L Hailey
(74) *Attorney, Agent, or Firm* — Patterson Thuente Pedersen, P.A.

(57) ABSTRACT

A method of preparing a Fischer-Tropsch catalyst for handling, storage, transport and deployment, including the steps of impregnating a porous support material with a source of cobalt, calcining the impregnated support material, activating the catalyst, and passivating the activated catalyst.

36 Claims, 4 Drawing Sheets

(51) Int. Cl.
*B01J 23/889* (2006.01)
*B01J 23/89* (2006.01)
*B01J 35/10* (2006.01)
B01J 23/00 (2006.01)
B01J 37/02 (2006.01)

(56) References Cited

U.S. PATENT DOCUMENTS

| | | | |
|---|---|---|---|
| 4,605,679 A * | 8/1986 | Kobylinski et al. | 518/700 |
| 4,729,981 A * | 3/1988 | Kobylinski et al. | 502/259 |
| 6,096,790 A | 8/2000 | Zennaro et al. | |
| 2003/0144130 A1 | 7/2003 | Clark et al. | |
| 2010/0022670 A1 | 1/2010 | Soled et al. | |
| 2010/0152035 A1 * | 6/2010 | Visagie et al. | 502/325 |
| 2010/0174002 A1 | 7/2010 | Kibby et al. | |

FOREIGN PATENT DOCUMENTS

| | | |
|---|---|---|
| WO | WO 2005/072866 A1 | 8/2005 |
| WO | WO 2008/129024 A1 | 10/2008 |
| WO | WO 2008/139407 A2 | 11/2008 |
| WO | WO 2010/078360 A2 | 7/2010 |
| WO | WO 2012/010820 A2 | 1/2012 |

* cited by examiner

CATALYST TREATMENT

RELATED APPLICATIONS

The present application is a National Phase entry of PCT Application No. PCT/GB2011/001067, filed Jul. 15, 2011, which claims priority from Great Britain Application No. 1012326.3, filed Jul. 22, 2010, the disclosures of which are hereby incorporated by reference in their entireties.

TECHNICAL FIELD

The present invention relates to the treatment of Fischer-Tropsch (F-T) catalysts prior to use in an F-T synthesis reaction. The present invention is particularly applicable to supported cobalt-based F-T catalysts.

BACKGROUND OF THE INVENTION

F-T catalysts generally comprise a porous support material impregnated with a catalytically active component, such as cobalt or iron. The active component is deposited on the support as a compound but prior to use, it must be reduced to metal form, or activated. Currently, in the case of Co-based F-T catalysts, the support impregnated with the Co-containing compound must be reduced at a temperature of at least 200° C. In its activated state, the catalyst is pyroforic and impossible to handle in air, therefore contact with air has to be avoided. The catalyst must therefore be encapsulated in wax and formed into flakes into a dedicated unit, to reach a so-called REF state (reduced, encapsulated, flaked). The flakes are then packed in bags and stored within drums sealed in inert atmosphere before transportation to site. If this can be simplified, achieved more cost effectively or avoided, it will reduce the total cost of the catalyst.

SUMMARY OF THE INVENTION

It is therefore an object of the present invention to prepare the catalyst for use without the need to resort to the REF state.

In certain aspects of the present invention, a method of preparing a Fischer-Tropsch catalyst for handling, storage, transport and deployment comprises the steps of impregnating a porous support material with a source of cobalt as a catalytically active material to produce an impregnated support material, calcining the impregnated support material to produce a calcined impregnated support material, activating the calcined impregnated support material with a reducing gas at a temperature up to 500° C. to produce an activated catalyst, and passivating the activated catalyst to produce a passivated catalyst. In certain aspects, the method further comprises re-activating the passivated catalyst to produce a re-activated catalyst and deploying the re-activated catalyst.

In certain aspects, the passivated catalyst is first re-activated, then deployed by loading the re-activated catalyst into a reactor. The passivated catalyst can be deployed by loading it into a reactor and then re-activated in situ in the reactor. In some aspects, the initial activation and passivation steps are carried out at a first location, the passivated catalyst is transported to a second location, and the re-activation is carried out at the second location. The passivated catalyst can be storated at the first and/or second location.

In certain aspects of the present invention, a method of preparing and deploying a catalyst comprises the steps of impregnating a porous support material with a source of catalytically active material to produce a impregnated support material, activating the impregnated support material with a reducing gas at a temperature up to 600° C. to produce an activated catalyst, passivating the activated catalyst at a first location by treating the activated catalyst with an oxidizing gas thereby forming an oxide layer on the surface of the catalyst to produce a passivated catalyst, transporting the passivated catalyst to a second location, and re-activating the passivated catalyst to produce a re-activated catalyst and loading the re-activated catalyst into a reactor at the second location.

The present invention is also directed at the supported catalyst produced by the foregoing methods. In certain aspects of the present invention, the supported catalyst has a cobalt content of 10 to 40% by weight, preferably from 12 to 25% by weight.

In certain aspects of the present invention a process for the production of hydrocarbons, comprises impregnating a porous support material with a source of cobalt as a catalytically active material to produce an impregnated support material, calcining the impregnated support material to produce a calcined impregnated support material, activating the calcined impregnated support material with a reducing gas at a temperature up to 500° C. to produce an activated catalyst, passivating the activated catalyst to produce a passivated catalyst, and subjecting $H_2$ and CO gases to a Fischer-Tropsch synthesis reaction in a three-phase reactor in the presence of the passivated catalyst.

The Fischer-Tropsch reaction may be a three-phase reaction in which the reactants are gaseous, the product is at least partially liquid and the catalyst is solid. In certain aspects, the Fischer-Tropsch synthesis reaction is carried out in a slurry bubble column reactor, and the $H_2$ and CO gases may be supplied to a slurry in the three-phase reactor, the slurry comprising the catalyst in suspension in a liquid including the reaction products of the $H_2$ and CO gases, the catalyst being maintained in suspension in the slurry at least partly by the motion of the gas supplied to the slurry.

In certain aspects, a reaction temperature of the Fischer-Tropsch synthesis reaction is in the range 190 to 260° C., preferably 210 to 240° C., a reaction pressure of the Fischer-Tropsch synthesis reaction is in the range 10 to 60 bar, preferably 15 to 30 bar, an $H_2$/CO ratio of the $H_2$ and CO gases supplied to the Fischer-Tropsch synthesis reactor is in the range 1.0 to 2.2, preferably 1.2 to 1.95, and a superficial gas velocity in the reactor is in the range 5 to 60 cm/s, preferably 20 to 40 cm/s.

The product of the Fischer-Tropsch synthesis reaction may subsequently be subjected to post-processing, which may include filtration, de-waxing, hydro-isomerization, hydro-cracking and combinations thereof.

Figure 1:
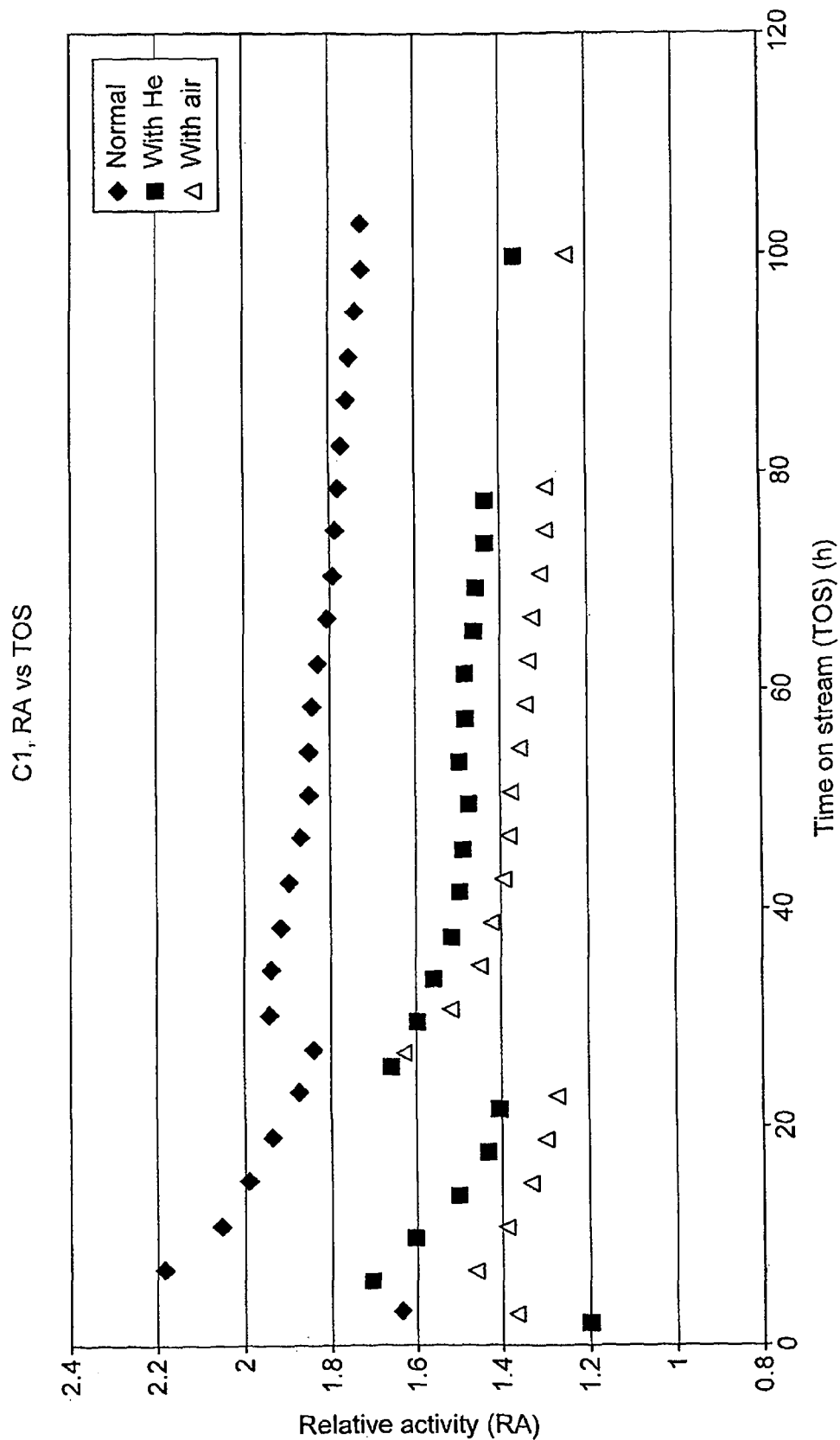
FIG. 1 is a graph of the Relative Activity against Time on stream for a catalyst "C1" with the support material being unmodified γ-alumina, the diamond points representing the catalyst without treatment according to the present invention; the square points representing the catalyst treated according to the present invention and stored overnight under helium following passivation; and the triangular points representing the catalyst treated according to the invention and stored overnight under air following passivation.

While the present invention is amendable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION OF THE INVENTION

According to the present invention, there is provided a method of preparing a Fischer-Tropsch catalyst for handling, storage, transport and deployment, which comprises the steps of: impregnating a porous support material with a source of cobalt as a catalytically active material; calcining the impregnated support material; activating the catalyst by treating the impregnated support material with a reducing gas at a temperature up to 500° C.; and passivating the activated catalyst.

The passivation process creates a protective layer on the surface of the catalyst, thereby preventing or significantly reducing deterioration of the catalyst by exposure to air.

Preferably, the passivated catalyst is re-activated and deployed. It may first be re-activated, then deployed by loading the re-activated catalyst into a reactor, or it may first be deployed by loading it into a reactor and then re-activated in situ in the reactor. Possibly, therefore, the initial activation and passivation steps are carried out at a first location, the passivated catalyst is transported to a second location, and the re-activation is carried out at the second location. Furthermore, it is possible for the passivated catalyst to be stored at the first and/or second location.

In practice, this means that the catalyst can be produced at one location and then transported in a passivated state to a reactor at another location (which may be remote) without the need to resort to the REF state.

Preferably, prior to the active metal impregnation step, an initial support material is impregnated with a source of a divalent metal capable of forming a spinel phase with alumina in a first impregnation step. Preferably, the source of a divalent metal comprises a source of cobalt, zinc, magnesium, manganese, nickel or iron. More preferably, the source of a divalent metal comprises nickel or zinc in an amount of less than 25 wt % of the final reduced catalyst, for example, less than 20 wt %, alternatively less than 8 wt %.

Preferably, after the divalent metal impregnation step, but prior to the active metal impregnation step, the impregnated initial support material is calcined. Preferably, this first calcination step is carried out at a temperature in the range 700 to 1300° C., more preferably between 900 and 1250° C. Conveniently, after the first calcination step, the modified alumina support has a surface area of 20 to 100 m²/g.

It should be understood that incorporation of the divalent metal with the initial support material can be carried out in different ways, e.g. by intimate mixing prior to forming a suitable shape of the support. As an example, a modified support suitable for making a cobalt catalyst can be prepared by impregnation of γ-alumina particles with nickel nitrate followed by drying and calcination steps, up to a maximum temperature of 1150-1200° C. During this process, nickel aluminate, a spinel compound, will be formed and possible larger or smaller amounts of α-alumina Unmodified γ-alumina may also be used as a support.

The method may include the additional step of incorporating a stabilizer into the alumina support material, prior to the cobalt impregnation step. Preferably, the stabilizer comprises lanthanum. In preparing the support material, organic or inorganic binders can also be used.

Further, in the support preparation, as well as in subsequent steps, great care should be taken to limit the concentration of catalytic poisons for the Fischer-Tropsch reaction to acceptable levels. Such poisons typically encompass alkali metals, alkaline earth metals, sulfur and chloride.

Preferably, the support is subjected to a drying step, prior to the calcining step. Preferably, the drying step is carried out at a temperature in the range 80 to 160° C., preferably 110 to 150° C., for a period of 0.2 to 10 hours, preferably 0.5 to 4 hours.

Preferably, the activation step comprises reduction of a substantial portion of the catalytically active metal compound present to the metal. Preferably, the reducing gas used is hydrogen. Sometimes it can be convenient to split the reduction step(s) into more than one reduction step. The reduction can be performed in a fluid-bed reactor, or a fixed-bed reactor, or other reactor configurations can be employed. The reduction operation can be batch-wise or continuous.

Preferably, the activation step comprises treating the impregnated support material with a hydrogen-containing gas at a holding temperature in the range 300 to 500° C. Preferably, during the activation step, the temperature is raised at a rate in the range 0.5 to 5° C. per minute and held at the holding temperature for a time in the range 0.1 to 25 hours. Preferably, 0.3 to 3 hours. In a preferred system, the catalyst is treated with hydrogen at ambient pressure while raising the temperature through 1° C./min to 350° C. and holding this temperature for 16 hours.

Before impregnation, the catalyst support may be precalcined at about 500° C. One convenient way of loading active metal and promoter onto the support is by impregnation in one step, but multiple steps can also be employed, from a mixed aqueous solution of appropriate metal salts, generally of cobalt nitrate and perrhenic acid or alternatively ammonium perrhenate. The impregnation technique generally used is the pore filling or "incipient wetness" method, in which the solution is mixed with the dry support until the pores are filled. The definition of the end point of this method may vary somewhat from laboratory to laboratory so that an impregnated catalyst could have a completely dry appearance or a sticky snow-like appearance. However, in no instances would there be any free flowing liquid present when the incipient wetness method is employed.

A number of alternative impregnation procedures are known in the art which use alternative solvents and chemicals, however, in the present invention, the preferred procedure involves aqueous incipient wetness with solutions of cobalt nitrate $(Co(NO_3)_2 \cdot 6H_2O)$ and perrhenic acid $(HReO_4)$. Possible alternatives include using cobalt acetate(s), cobalt carbonate(s) cobalt halide(s), cobalt carbonyl(s), cobalt oxalate(s), cobalt phosphate(s), organic cobalt compounds, ammonium perrhenate, rhenium halide(s), rhenium carbonyl(s), industrial metal salt solutions, organic solvents, etc. The solution may also encompass pH regulating agents, complexing agents, surfactants and other compound(s) that in some way influence the impregnation and following steps. e.g. ammonia or urea can be used. Furthermore, the impregnation technique may encompass all available methods besides incipient wetness, such as precipitation, impregnation from slurry with surplus liquid, chemical vapor deposition etc. It is well known that the impregnation method may influence the dispersion of the active metal (cobalt) and hence the catalytic activity.

The impregnated catalyst is dried, typically at 80-120° C., to remove water from the catalyst pores, and then calcined at typically 200-450° C., e.g. at 300° C. for 0.2 to 16 h. The method may include the additional step of impregnating or co-impregnating the support material with a promoter. The promoter may comprise platinum or rhenium. Preferably, the promoter is rhenium and the source of rhenium is selected from perrhenic acid $(HReO_4)$, ammonium perrhenate, rhenium halide(s) and rhenium carbonyl(s).

Preferably, the passivation step comprises treating the activated catalyst with an oxidizing gas for a period of time sufficient to create a protective layer of oxide on the surface of the catalyst. Preferably, the oxidizing gas comprises oxygen or air.

Creating a protective layer on the surface of the catalyst is one way to protect the bulk of the catalyst from air, and this can be done by a passivation procedure. During passivation, the catalyst is contacted with air for a period sufficient to create a protective layer of oxide on the surface of the catalyst, thereby avoiding the bulk of the catalyst to have contact with air.

Preferably, the oxidizing gas comprises from 0.2 to 5.0% oxygen in nitrogen, and the treatment is conducted at a temperature in the range 20 to 300° C. for a period in the range 0.01 to 10 hours, preferably 0.1 to 2 hours. In a preferred laboratory system, the activated catalyst is subjected to 0.5% oxygen in nitrogen at 40° C. for 4 hours followed by sealing off the reactor overnight in either helium or air.

In a commercial operation, effort should be made to reduce the holding time, preferably to below 2 hours to secure high throughput. After passivation, the catalyst is conveniently stored in drums or other sealed containers filled with an inert gas, but for some catalysts, it is expected that passivation is so effective that using an inert gas is not needed, and ordinary air can be used.

Optionally, the passivated catalyst is re-activated by treatment with a reducing gas at a temperature in the range 150 to 450° C. for a period in the range 0.1 to 100 hours, preferably 0.2 to 10 hours. The actual conditions during re-activation will at least depend on the catalyst formulation, the severity of the passivation and the re-activation equipment at hand. For instance, if the re-activation is to be carried-out in situ in a slurry F-T reactor the temperature will be limited to 250° C. or lower.

In one embodiment of the invention, the reactivation is conducted by submitting the passivated catalyst to a standard reductive synthesis gas, which will remove the protective oxide layer. This may be conducted while the passivated catalyst is in a slurry, for example formed with hydrocarbon liquid. This can be carried out in an F-T slurry reactor, or in a separate vessel. An alternative to a standard reductive synthesis gas would be pure hydrogen or synthesis gas with a high hydrogen/carbon monoxide ratio.

In order to achieve re-activation, the passivated catalyst can be loaded into the reactor or separate vessel in powder form, or mixed with a hydrocarbon liquid, and pumped in. The latter procedure can be combined with, for example, a recycle loop that may be in place, in order to remove fines from the reactor.

Prior to the activation step, the impregnated support material is calcined. Preferably, the calcination is carried out at a temperature in the range 150 to 600° C., for example 200 to 450° C.

Preferably, the initial support material is alumina and more preferably substantially comprises γ-alumina. Preferably, the initial alumina support material has a specific surface area in the range 100 to 400 $m^2/g$, e.g. 150 to 250 $m^2/g$ and a pore volume greater than 0.2 $cm^3/g$, preferably greater than 0.4 $cm^3/g$.

In a preferred aspect, the invention provides a method of preparing and deploying a catalyst, which comprises the steps of: impregnating a porous support material with a source of catalytically active material; activating the catalyst by treating the impregnated support material with a reducing gas at a temperature up to 500° C.; passivating the catalyst at a first location by treating the activated catalyst with an oxidizing gas thereby forming an oxide layer on the surface of the catalyst; transporting the passivated catalyst to a second location; re-activating the catalyst and loading the catalyst into a reactor, at the second location.

The preferred features of the present invention outlined above are also applicable to this latter aspect of the present invention.

The present invention also extends to catalyst material made in accordance with the present invention. Conveniently, the cobalt content of the catalyst is from 10 to 40% by weight, preferably from 12 to 25% by weight. The catalyst may incorporate less than 3% by weight of a promoter, preferably less than 0.5 wt %, such as platinum or rhenium.

Preferably, the specific surface area of the prepared oxide catalyst, comprising the cobalt oxide on the modified support, is up to 100 $m^2/g$, and the pore volume of the prepared catalyst is from 0.05 to 0.5 $cm^3/g$, preferably above 0.15 cm 3/g.

The present invention also extends to the use of the catalyst in an F-T synthesis, which is conducted in the same three-phase-reactor as a slurry bubble column reactor in which the catalyst was activated. Thus, the present invention also extends to a process for the production of hydrocarbons which comprise subjecting $H_2$ and CO gases to a Fischer-Tropsch synthesis reaction in the same three-phase-reactor in the presence of a catalyst of the present invention. The process can be conducted under typical F-T operating conditions.

Preferably, therefore, the reaction is a three-phase reaction in which the reactants are gaseous, the product is at least partially liquid and the catalyst is solid, and is carried out in a slurry bubble column reactor. Preferably, the $H_2$ and CO are supplied to a slurry in the reactor, the slurry comprising the catalyst in suspension in a liquid including the reaction products of the $H_2$ and CO, the catalyst being maintained in suspension in the slurry at least partly by the motion of the gas supplied to the slurry. The reaction temperature may be in the range 190 to 260° C., preferably 210 to 240° C., and the pressure may be in the range 10 to 60 bar, preferably 15 to 30 bar. The $H_2$/CO ratio of the gas fed to the reactor may be in the range 0.5 to 2.2, preferably 1.2 to 1.95, and the superficial gas velocity may be in the range 5 to 60 cm/s, preferably 20 to 40 cm/s. The products can be subjected to various post-processing operations, such as filtration, de-waxing, hydro-isomerization and/or hydro-cracking.

Examples

The invention will now be illustrated in the following non-limiting examples.

In order to investigate whether it is practical to passivate and then re-activate an F-T catalyst for use in a three-phase-reactor, the following experiments were carried out in a fixed bed test unit for two F-T catalysts, designated C1 and C2.

In the case of C1, the support material was unmodified γ-alumina. In the case of C2, the support was γ-alumina modified by the treatment with a divalent metal to form a spinel, as described above.

These support materials were impregnated by incipient wetness to give, respectively, 20 wt % Co/1.0 wt % Re and 12 wt % Co/0.5 wt % Re after drying, calcination and reduction.

Firstly, the catalysts were subjected to an activation consisting of reduction by hydrogen at ambient pressure while raising the temperature through 1° C./min to 350° C. and holding this temperature for 16 h. This was followed by passivation in 0.5% oxygen in nitrogen at 40° C. for 4 hours. The reactor was then sealed off over night in either helium or air. After this treatment, an F-T synthesis was run as usual.

Figure 2:
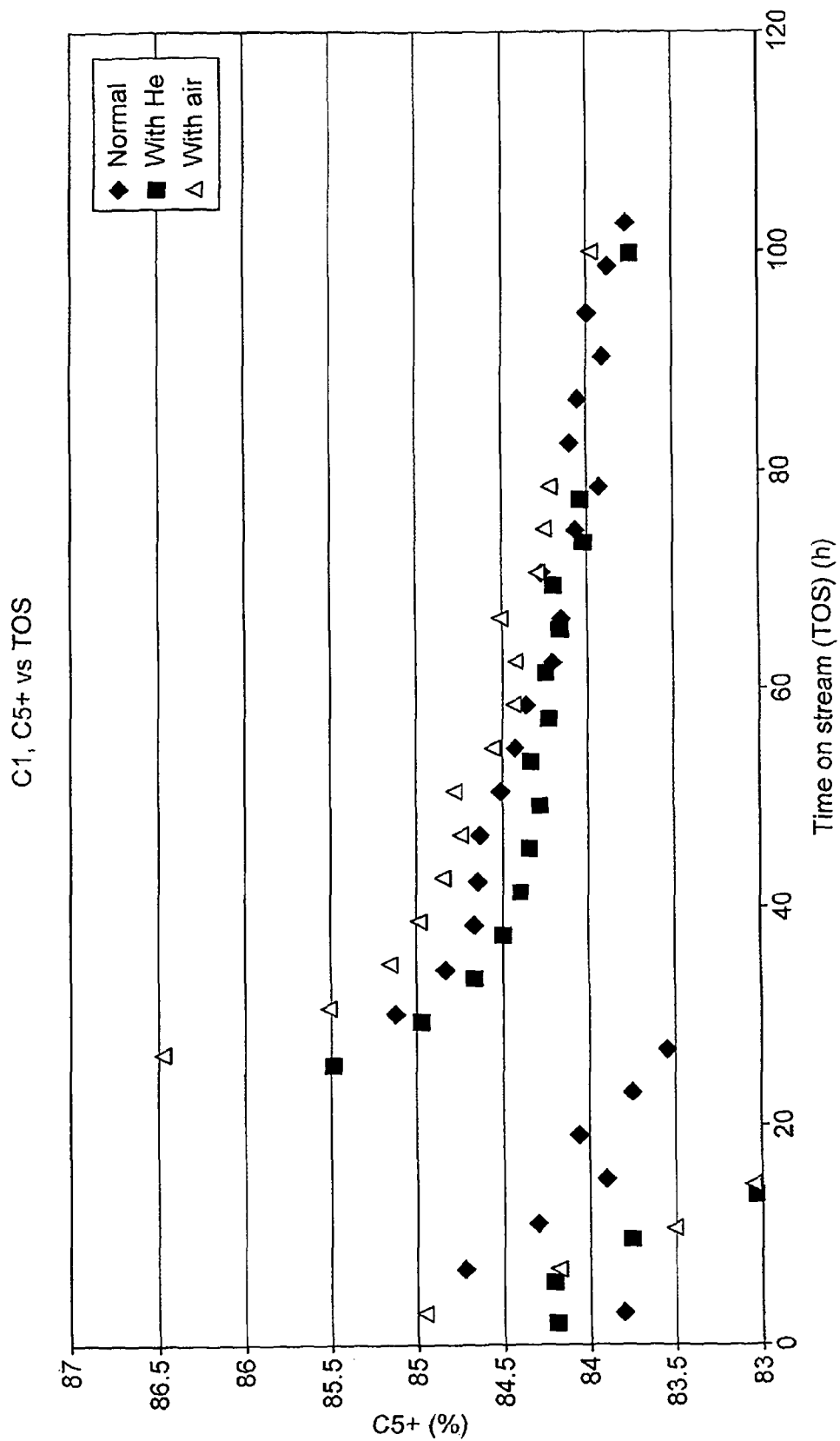
FIG. 2 is a graph of the % of C5+ hydrocarbons produced against Time on Stream for the C1 catalyst, the diamond points representing the catalyst without treatment according to the present invention; the square points representing the catalyst treated according to the present invention and stored overnight under helium following passivation; and the triangular points representing the catalyst treated according to the invention and stored overnight under air following passivation.
Figure 3:
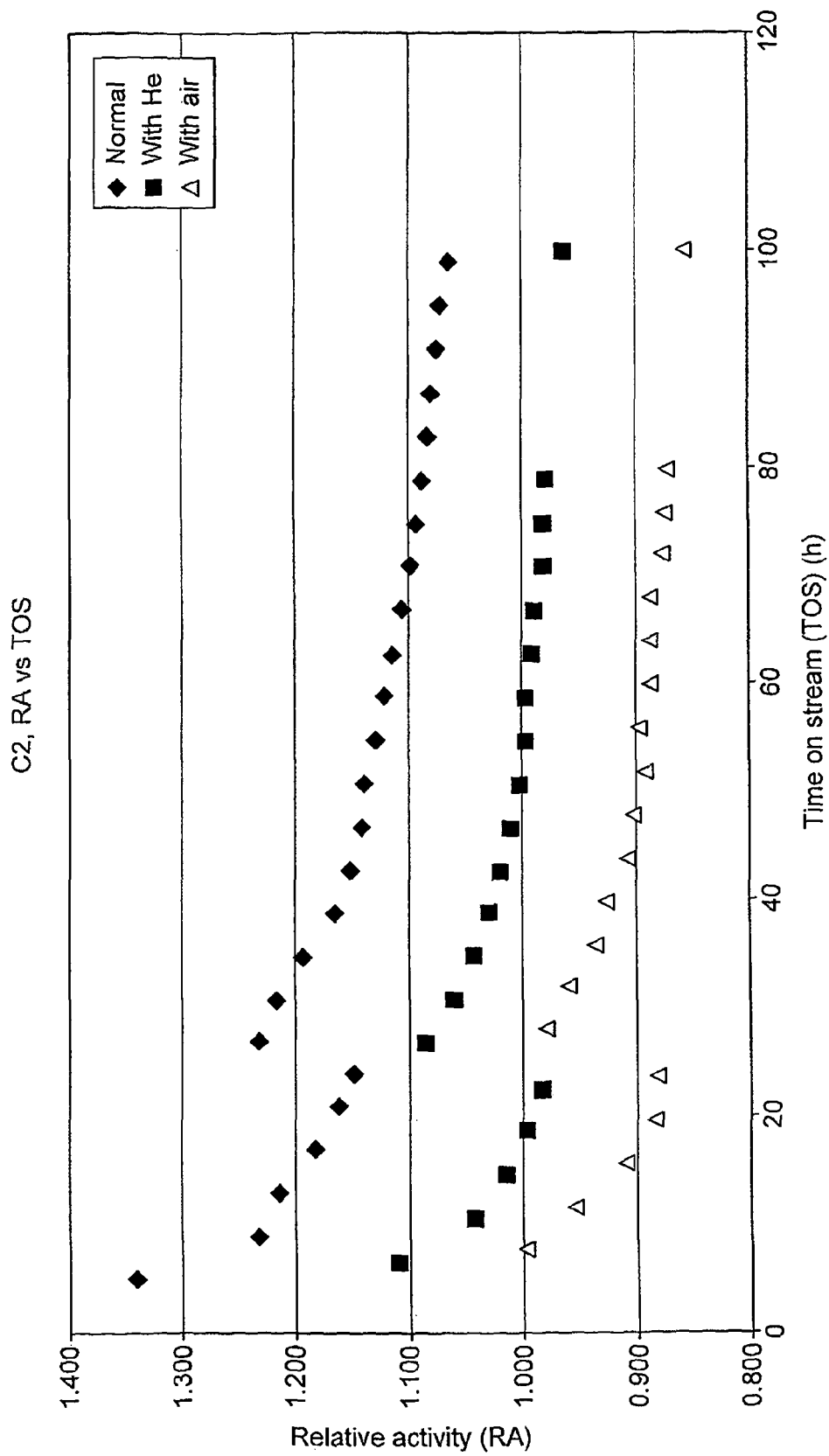
FIG. 3 is a graph of the Relative Activity against Time on stream for a catalyst "C2" with the support material being γ-alumina modified by the treatment with a divalent metal to form a spinel, the diamond points representing the catalyst without treatment according to the present invention; the square points representing the catalyst treated according to the present invention and stored overnight under helium following passivation; and the triangular points representing the catalyst treated according to the invention and stored overnight under air following passivation.
Figure 4:
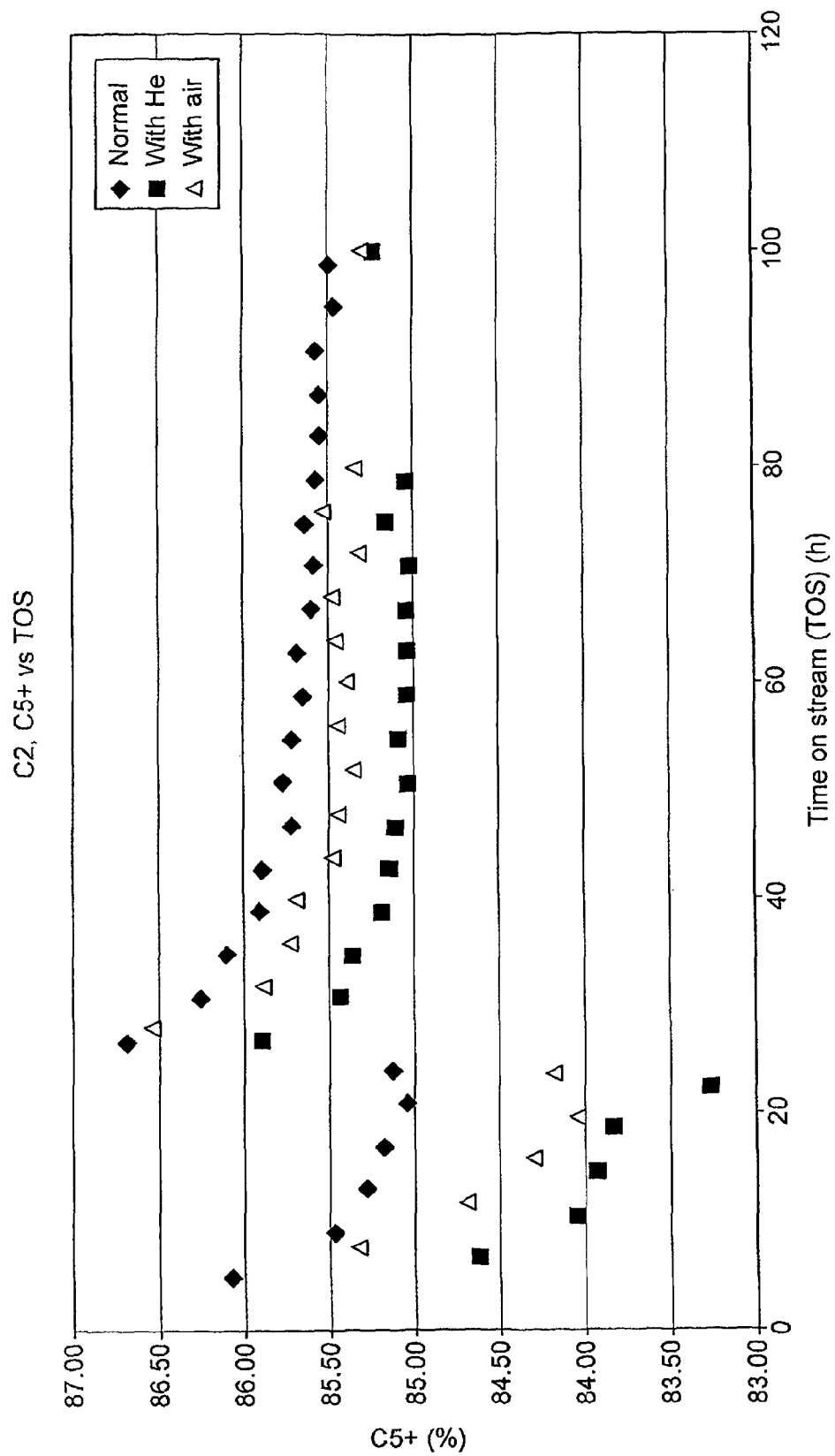
FIG. 4 is a graph of the % of C5+ hydrocarbons produced against Time on Stream for the C2 catalyst, the diamond points representing the catalyst without treatment according to the present invention; the square points representing the catalyst treated according to the present invention and stored overnight under helium following passivation; and the triangular points representing the catalyst treated according to the invention and stored overnight under air following passivation.

The results compared with standard F-T catalysts are given in FIGS. 1 to 4.

In all the graphs (FIGS. 1 to 4): diamond points represent the catalyst without treatment according to the invention; square points represent the catalyst treated according to the invention and stored overnight under helium following passivation; triangular points represent the catalyst treated according to the invention and stored overnight under air following passivation.

In the present Examples, a relative activity (RA) of 1 corresponds to a rate of about 1.1 g of hydrocarbon produced per g of catalyst per hour. A relative $C^5$+ activity of 1 corresponds to 78% after 90 hours time on stream in a fixed bed text reactor.

It can be seen from FIGS. 1 to 4 that the effect of oxygen in the passivation step is not detrimental, even though part of the activity is lost. The effect on the selectivity is negligible, indicating that no change in Co particle properties is taking place.

The experiments show that the catalyst is quite resistant against air, indicating that the catalyst can be stored and handled in air after carrying out an adequate passivation procedure. This simplifies the treatment of the catalyst after reduction, and leads to avoiding the encapsulation in wax.

Thus, a significant process step (REF) is avoided, and transport of catalyst is simplified, since it is easier and safer to transport the passivated catalyst than REF catalyst.

The invention claimed is:

1. A method of preparing a Fischer-Tropsch catalyst for handling, storage, transport and deployment, the method comprising the steps of:
    impregnating an initial support material comprising alumina with a source of a divalent metal capable of forming a spinel phase with alumina to form a porous support material having a spinel phase;
    drying the porous support material;
    calcining the porous support material at a temperature reaching at least 1000° C.;
    impregnating the porous support material with a source of cobalt as a catalytically active material to produce an impregnated support material;
    calcining the impregnated support material to produce a calcined impregnated support material;
    activating the calcined impregnated support material with a reducing gas comprising hydrogen at a temperature up to 500° C. to reduce a substantial portion of the cobalt present to the metal to produce an activated catalyst; and
    passivating the activated catalyst with an oxidizing gas for a period of time sufficient to create a protective layer of oxide on the surface of the catalyst to produce a passivated catalyst.

2. The method of claim 1, further comprising re-activating and deploying the passivated catalyst.

3. The method of claim 2, wherein the passivated catalyst is first re-activated, then deployed by loading the re-activated catalyst into a reactor.

4. The method of claim 2, wherein the passivated catalyst is deployed by loading it into a reactor and then re-activated in situ in the reactor.

5. The method of claim 2, wherein the initial activation and passivation steps are carried out at a first location, the passivated catalyst is transported to a second location, and the re-activation is carried out at the second location.

6. The method of claim 5, wherein the passivated catalyst is stored at the first and/or second location.

7. The method of claim 1, wherein the impregnation step comprises an incipient wetness treatment, wherein an aqueous solution of cobalt as the catalytically active material is mixed with the porous support material until the pores are filled, and the impregnated support is then dried.

8. The method of claim 1, wherein the activation step comprises treating the impregnated support material with a hydrogen-containing gas at a holding temperature in the range 300 to 500° C.

9. The method of claim 8, wherein during the activation step, the temperature is raised at a rate in the range 0.5 to 5° C. per minute and held at the holding temperature for a time in the range 0.3 to 3 hours.

10. The method of claim 1, wherein the passivated catalyst is re-activated by treatment with a reducing gas at a temperature in the range 150 to 450° C. for a period in the range 0.2 to 10 hours.

11. The method of claim 10, wherein the re-activation is carried out in an F-T synthesis reactor with a synthesis gas, the synthesis gas enriched in hydrogen.

12. The method of claim 11, wherein the F-T synthesis reactor is a slurry reactor.

13. The method of claim 10, wherein the re-activation is carried out in a vessel separate from an F-T synthesis reactor.

14. The method of claim 1, wherein the porous support material predominantly comprises γ-alumina.

15. The method of claim 14, wherein the initial alumina support material has a specific surface area in the range 100 to 400 $m^2$/g and a pore volume greater than 0.2 $cm^3$/g.

16. The method of claim 1, wherein the divalent metal is selected from Ni, Mg and Zn.

17. The method of claim 1, wherein the source of cobalt as the catalytically active material is selected from cobalt nitrate ($Co(NO_3)_2$), cobalt acetate(s), cobalt halide(s), cobalt carbonyl(s), cobalt oxalate(s), cobalt phosphate(s), cobalt carbonate(s), cobalt (hexa)amine salt(s) and organic cobalt compounds.

18. A supported catalyst produced by the method of claim 1.

19. The catalyst of claim 18, wherein the cobalt content of the catalyst from 10 to 40% by weight.

20. A method of preparing and deploying a catalyst, the method comprising the steps of:
impregnating an initial support material comprising alumina with a source of a divalent metal capable of forming a spinel phase with alumina to form a porous support material having a spinel phase;
drying the porous support material;
calcining the porous support material at a temperature reaching at least 1000° C.;
impregnating the porous support material with a source of catalytically active material to produce a impregnated support material;
activating the impregnated support material with a reducing gas at a temperature up to 600° C. to produce an activated catalyst;
passivating the activated catalyst at a first location by treating the activated catalyst with an oxidizing gas thereby forming an oxide layer on the surface of the catalyst to produce a passivated catalyst;
transporting the passivated catalyst to a second location; and
re-activating the passivated catalyst to produce a re-activated catalyst and loading the re-activated catalyst into a reactor at the second location.

21. A process for the production of hydrocarbons, comprising:
impregnating an initial support material comprising alumina with a source of a divalent metal capable of forming a spinel phase with alumina to form a porous support material having a spinel phase;
drying the porous support material;
calcining the porous support material at a temperature reaching at least 1000° C.;
impregnating the porous support material with a source of cobalt as a catalytically active material to produce an impregnated support material;
calcining the impregnated support material to produce a calcined impregnated support material;
activating the calcined impregnated support material with a reducing gas at a temperature up to 500° C. to produce an activated catalyst;
passivating the activated catalyst to produce a passivated catalyst; and
subjecting $H_2$ and CO gases to a Fischer-Tropsch synthesis reaction in a three-phase reactor in the presence of the passivated catalyst.

22. The method of claim 21, wherein the Fischer-Tropsch reaction is a three-phase reaction in which the reactants are gaseous, the product is at least partially liquid and the catalyst is solid.

23. The method of claim 21, wherein the Fischer-Tropsch synthesis reaction is carried out in a slurry bubble column reactor.

24. The method of claim 21, wherein the $H_2$ and CO gases are supplied to a slurry in the three-phase reactor, the slurry comprising the catalyst in suspension in a liquid including the reaction products of the $H_2$ and CO gases, the catalyst being maintained in suspension in the slurry at least partly by the motion of the gas supplied to the slurry.

25. The method of claim 21, wherein a reaction temperature of the Fischer-Tropsch synthesis reaction is in the range 190 to 260° C.

26. The method of claim 21, wherein a reaction pressure of the Fischer-Tropsch synthesis reaction is in the range 10 to 60 bar.

27. The method of claim 21, wherein an $H_2$/CO ratio of the $H_2$ and CO gases supplied to the three-phase reactor is in the range 1.0 to 2.2.

28. The method of claim 21, wherein a superficial gas velocity in the three-phase reactor is in the range 5 to 60 cm/s.

29. The method of claim 21, wherein the product of the Fischer-Tropsch synthesis reaction is subsequently subjected to post-processing.

30. The method of claim 29, wherein the post-processing is selected from filtration, de-waxing, hydro-isomerization, hydro-cracking and combinations thereof.

31. A method of preparing a Fischer-Tropsch catalyst for handling, storage, transport and deployment, the method comprising the steps of:
impregnating an initial support material comprising alumina with a source of a divalent metal capable of forming a spinel phase with alumina to form a porous support material having a spinel formed with the alumina;
drying the porous support material;
calcining the porous support material at a temperature reaching at least 1000° C.;
impregnating the porous support material with a source of cobalt as a catalytically active material to produce an impregnated support material;
calcining the impregnated support material to produce a calcined impregnated support material;
activating the calcined impregnated support material with a reducing gas at a temperature up to 500° C. to produce an activated catalyst; and
passivating the activated catalyst to produce a passivated catalyst.

32. The method of claim 31, wherein the activation step comprises reduction of a substantial portion of the cobalt present to the metal.

33. The method of claim 31, wherein the reducing gas used in the activation step comprises hydrogen.

34. The method of claim 31, wherein the passivation step comprises treating the activated catalyst with an oxidizing gas for a period of time sufficient to create a protective layer of oxide on the surface of the catalyst.

35. The method of claim 34, wherein the oxidizing gas comprises oxygen or air.

36. The method of claim 34, wherein the oxidizing gas comprises from 0.2 to 5.0% oxygen in nitrogen, and the treatment is conducted at a temperature in the range 20 to 300° C. for a period in the range 0.1 to 2 hours.

* * * * *